US 8,264,196 B2

(12) United States Patent
Mera

(10) Patent No.: US 8,264,196 B2
(45) Date of Patent: Sep. 11, 2012

(54) CHARGE CONTROL APPARATUS, BATTERY PACK, AND VEHICLE

(75) Inventor: Masanobu Mera, Kanagawa (JP)

(73) Assignee: The Japan Research Institute, Limited, Tokyo (JP)

( * ) Notice: Subject to any disclaimer, the term of this patent is extended or adjusted under 35 U.S.C. 154(b) by 0 days.

(21) Appl. No.: 13/245,866

(22) Filed: Sep. 27, 2011

(65) Prior Publication Data
US 2012/0013303 A1 Jan. 19, 2012

Related U.S. Application Data

(63) Continuation of application No. PCT/JP2010/002266, filed on Mar. 29, 2010.

(30) Foreign Application Priority Data

Mar. 30, 2009 (JP) .................................. 2009-083666

(51) Int. Cl.
*H02J 7/00* (2006.01)
*H05K 7/14* (2006.01)
*B60K 1/00* (2006.01)

(52) U.S. Cl. ........ 320/104; 320/109; 320/116; 320/139; 307/149; 307/10.1; 180/65.1

(58) Field of Classification Search .................. 320/109, 320/104
See application file for complete search history.

(56) References Cited

U.S. PATENT DOCUMENTS

| 7,405,541 | B2 * | 7/2008 | Inokuchi et al. | 322/8 |
| 7,471,064 | B2 * | 12/2008 | Sobue et al. | 320/116 |
| 2005/0194931 | A1 * | 9/2005 | Sobue et al. | 320/116 |
| 2005/0242775 | A1 * | 11/2005 | Miyazaki et al. | 320/116 |
| 2006/0132085 | A1 * | 6/2006 | Loubeyre | 320/104 |

FOREIGN PATENT DOCUMENTS

| JP | H05-207664 A | | 8/1993 |
| JP | 08-322103 A | * | 12/1996 |
| JP | H08-322103 A | | 12/1996 |

OTHER PUBLICATIONS

International Search Report for International application No. PCT/JP2010/002266, mailed on Jun. 15, 2010.
English translation of Written Opinion (IB338) for International application No. PCT/JP2010/002266, mailed on Nov. 24, 2011.

* cited by examiner

*Primary Examiner* — Yalkew Fantu
(74) *Attorney, Agent, or Firm* — Ryuka

(57) ABSTRACT

A charge control apparatus for controlling how to charge a battery unit having a plurality of batteries connected in series, includes a connection control section that divides the batteries into a plurality of groups of batteries by switching connections between the batteries, according to a received current amount indicative of an amount of a current that can be received from one or more external power sources, and a charge control section that charges the groups of batteries in parallel with power received from the external power sources.

20 Claims, 10 Drawing Sheets

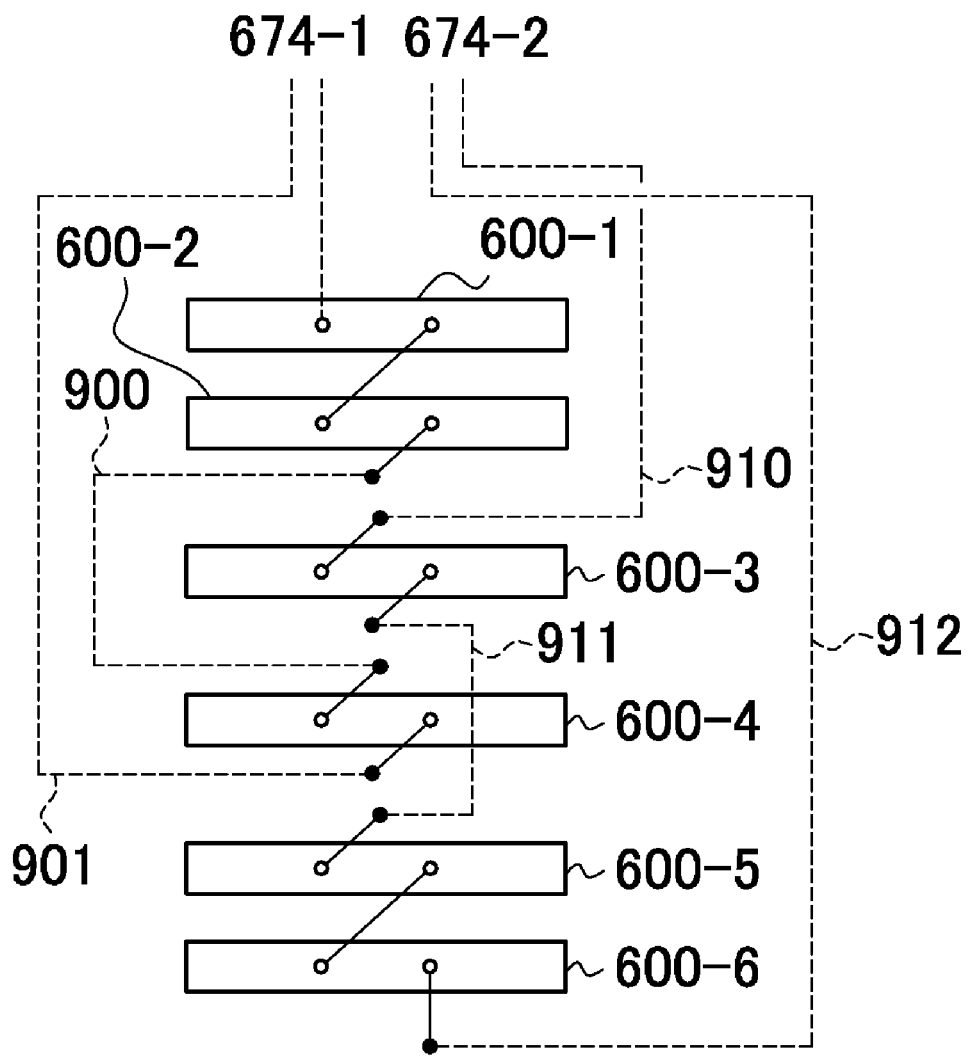
F I G . 9

CHARGE CONTROL APPARATUS, BATTERY PACK, AND VEHICLE

CROSS REFERENCE TO RELATED APPLICATION

The contents of the following international patent application are incorporated herein by reference:

International Patent Application No. PCT/JP2010/002266 filed on Mar. 29, 2010.

BACKGROUND

1. Technical Field

The present invention relates to a charge control apparatus, a battery pack, and a vehicle.

2. Related Art

Japanese Patent Application Publication No. 05-207664 discloses an electric car equipped with a battery for driving a motor.

Despite availability of an external power source with a sufficient capacity, it has been impossible to charge a battery at high speed.

SUMMARY

To solve the above-described problem, a first aspect of the present invention may include a charge control apparatus for controlling how to charge a battery unit having a plurality of batteries connected in series. The charge control apparatus includes a connection control section that divides the batteries into a plurality of groups of batteries by switching connections between the batteries, according to a received current amount indicative of an amount of a current that can be received from one or more external power sources, and a charge control section that charges the groups of batteries in parallel with power received from the external power sources.

The connection control section may increase the number of the groups of batteries into which the batteries are divided as the received current amount increases. The connection control section may increase the number of the groups of batteries into which the batteries are divided as the number of the external power sources increases. The connection control section may divide the batteries into the same number of the groups of batteries as the number of the external power sources.

The charge control apparatus may further include a division judging section that judges, based on the received current amount, whether the batteries are to be divided into the groups of batteries. Here, when the division judging section judges that the batteries are to be divided, the connection control section may divide the batteries into the groups of batteries, and when the division judging section judges that the batteries are to be divided, the charge control section may charge the groups of batteries in parallel with the power received from the external power sources.

The charge control apparatus may further include battery information obtaining section that obtains information indicative of a degree of degradation of each of the batteries. Here, the connection control section may divide batteries with similar degrees of degradation into the same group of batteries.

The charge control apparatus may further include a battery information obtaining section that obtains information indicative of an internal resistance of each of the batteries.

Here, the connection control section may divide batteries with similar internal resistances into the same group of batteries.

A second aspect of the present invention may include a battery pack including the above-described charge control apparatus and the above-described plurality of batteries.

A third aspect of the present invention may include a vehicle including the above-described battery pack and a motor driven by an energy stored in the battery pack.

The vehicle may further include a connector section to/from which a plurality of charging cables are externally attachable and detachable, where the charging cables supply power from the external power sources to the vehicle. Here, the connection control section may increase the number of groups of batteries into which the batteries are divided as the number of the charging cables attached to the connector section increases.

The connection control section may divide the batteries into the same number of the groups of batteries as the number of the charging cables attached to the connector section.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 9 illustrates, as an example, how groups of batteries are connected when charged in parallel.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
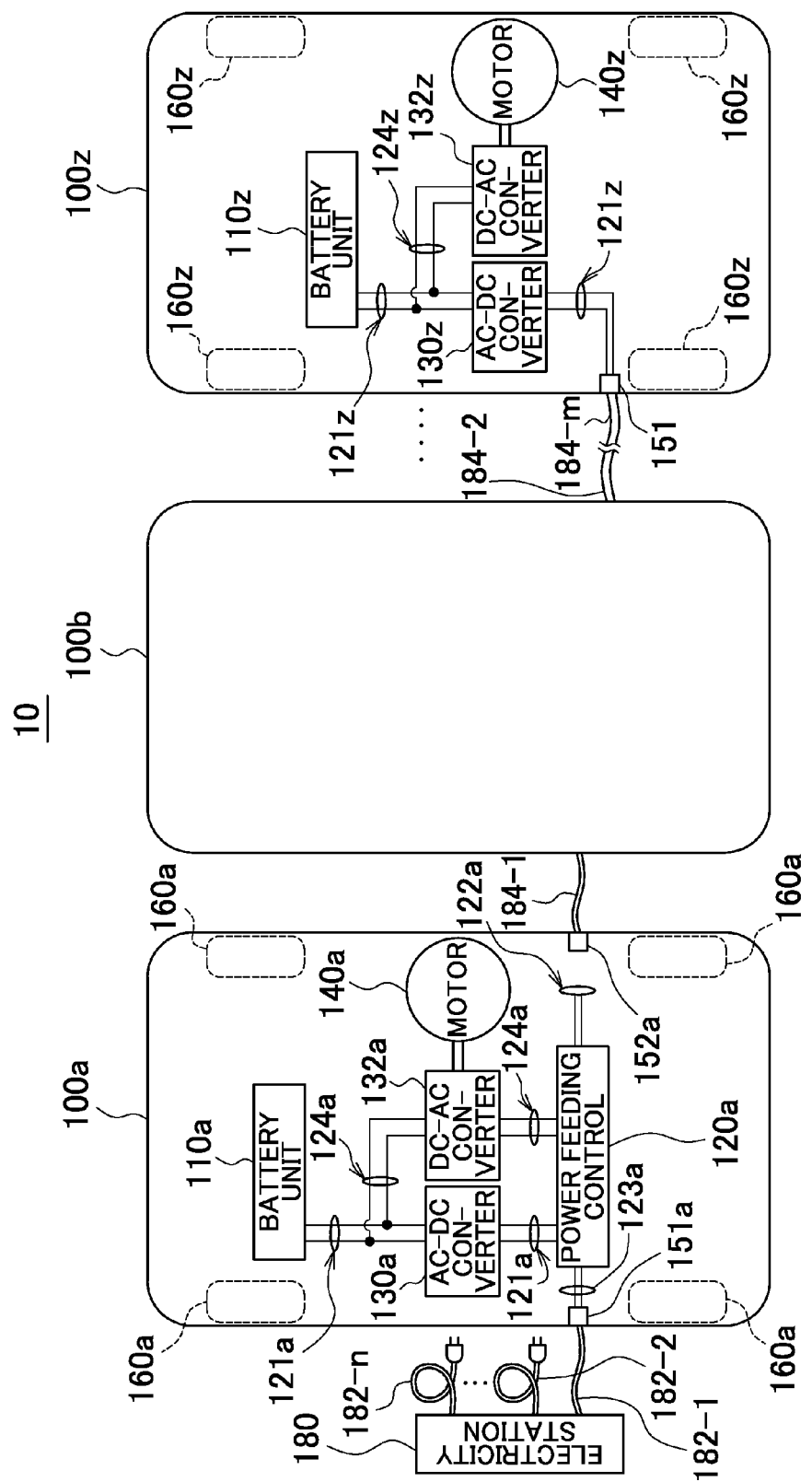
FIG. 1 illustrates an example of an electricity supply system 10.

FIG. 1 illustrates an example of an electricity supply system 10. The electricity supply system 10 relating to an embodiment of the present invention can function as a charge system that can efficiently charge a plurality of vehicles 100a-z. The vehicles 100a-z may be electric cars powered by electrical energy. In the following description, the vehicles 100a-z may be generally referred to as the vehicle 100.

The electricity supply system 10 includes an electricity station 180, station-use charging cables 182, and inter-vehicle charging cables 184. The electricity station 180 is an exemplary external power source that is a power source external to the vehicle 100 and supplies the vehicle 100 with electrical power to be consumed by the vehicle 100. Here, "consuming electrical power" means that electrical power is used to operate the electrical devices provided in the vehicle 100 and electrical power is stored in the battery unit provided in the vehicle 100.

The station-use charging cables 182 are connected to the electricity station 180. The station-use charging cables 182 establish electrical connection between the electricity station 180 and the vehicle 100 to enable the electricity station 180 to supply the vehicle 100 with electrical power.

The inter-vehicle charging cables 184 establish electrical connection between the vehicles 100 to enable electrical power to be supplied from one vehicle 100 to another vehicle 100. As will be described later, the inter-vehicle charging cables 184 can supply, to one vehicle 100, the electrical power supplied from the electricity station 180 or the electrical power supplied from the batteries provided in another vehicle 100.

With the use of the station-use charging cables 182 and the inter-vehicle charging cables 184, the electricity station 180 and the vehicles 100 can be cascade-connected. In this way, the vehicles 100, which are parked within a large space such as a parking lot, can be efficiently charged by the single electricity station 180.

A vehicle 100a includes an input connector 151a, an electrical receiving path 123a, a first power feeding path 121a, an AC-DC converter 130a, a battery unit 110a, an electrical output path 124a, a DC-AC converter 132a, a second power feeding path 122a, an output connector 152a, a motor 140a, and wheels 160a. The input connector 151a can be connected to the station-use charging cables 182. The output connector 152a can be connected to the inter-vehicle charging cables 184.

The vehicle 100b has components with the same functions as those of the vehicle 100a. The components of the vehicle 100b are respectively designated by the reference numerals of their corresponding components of the vehicle 100a, but the suffix "a" is replaced with "b". For example, the vehicle 100b includes an input connector 151b, an electrical receiving path 123b, a first power feeding path 121b, an AC-DC converter 130b, a battery unit 110b, an electrical output path 124b, a DC-AC converter 132b, a second power feeding path 122b, an output connector 152b, a motor 140b, and wheels 160b. The input connector 151b and the output connector 152b can be connected to the inter-vehicle charging cables 184.

A vehicle 100z includes an input connector 151z, a first power feeding path 121z, an AC-DC converter 130z, a battery unit 110z, an electrical output path 124z, a DC-AC converter 132z, and a motor 140z. The components of the vehicle 100z respectively have the same functions as the identically-named components of the vehicle 100a.

In the following description, the identically-named components of that are common to the vehicles 100a and 100b, or the identically-named components that are common to the vehicles 100a, 100b, and 100z are generally referred to in the singular form without the suffixed alphabetical letters. For example, the power feeding control sections 120a and 120b are generally referred to as the power feeding control section 120. The input connectors 151a, 151b, and 151z are generally referred to as the input connector 151.

The input connector 151 is configured such that the station-use charging cables 182 that supply the vehicle 100 with power from the electricity station 180, or the inter-vehicle charging cables 184 that transfer power from the battery unit 110 of one vehicle 100 to another vehicle 100 are externally attachable and detachable to/from the input connector 151. Here, the electricity station 180 and the battery unit 110 of the vehicle 100 function as external power sources for a particular vehicle 100. Therefore, the electricity station 180 and the battery unit 110 of the vehicle 100 may be generally referred to as an external power source in the following description.

The first power feeding path 121 supplies the battery unit 110 with received power, which is the power received at the input connector 151 from the external power source. The first power feeding path 121 supplies the battery unit 110 with the received power that is received from the external power source external to the vehicle 100. The second power feeding path 122 supplies a device external to the vehicle 100 with the received power. For example, the second power feeding path 122 supplies the received power to the battery unit 110 provided in another vehicle 100, via the output connector 152. For this purpose, the charging cables that are designed to supply the vehicle 100 with the power supplied onto the second power feeding path 122 are externally attachable and detachable to/from the output connector 152.

The power feeding control section 120 controls how much of the received power is to be supplied to the first and second power feeding paths 121 and 122. As will be described later, for example, the power feeding control section 120 controls which one of the first power feeding path 121 and the second power feeding path 122 is connected to the electrical receiving path 123.

Here, the power supplied to the vehicle 100 via the station-use charging cables 182 is AC power. The AC-DC converter 130 is provided on the first power feeding path 121 to convert the AC power to DC power. The DC power generated by the AC-DC converter 130 is supplied to the battery unit 110 as charge power used to charge the battery unit 110. The battery unit 110 is charged with the charge power and stores power therein.

The battery unit 110 can output the power stored therein to the electrical output path 124 in the form of DC power. Here, the DC-AC converter 132 is provided on the electrical output path 124 to convert the DC power originating from the battery unit 110 into AC power. The motor 140 is electrically connected to the DC-AC converter 132. The motor 140 is driven by the energy stored in the battery unit 110, thereby driving the wheels 160, for example. The motor 140 may be an AC motor. Here, the motor 140 may be a DC motor, in which case the motor 140 may be connected to the battery unit 110 without the DC-AC converter 132 therebetween.

The AC power generated by the DC-AC converter 132 may be supplied to the second power feeding path 122 through the control performed by the power feeding control section 120. For example, in order to supply the power stored in the battery unit 110 to another vehicle 100, the power feeding control section 120 connects the electrical output path 124 to the second power feeding path 122. In this way, the power feeding control section 120 controls how much power is supplied via the second power feeding path 122 from the battery unit 110 to a device external to the vehicle 100. The vehicle 100 of the present embodiment can receive power from the battery unit 110 of another vehicle 100 via the inter-vehicle charging cables 184.

Here, at least the battery unit 110a provided in the vehicle 100a connected to the electricity station 180 via the station-use charging cables 182 may be capable of being charged at high speed. On the other hand, the battery unit 110 provided in the vehicle 100 supplied with power via other vehicles 100, such as the battery units 110*b* and 110*z* of the vehicles 100*b* and 100*z* may not need to be capable of being charged at high speed. For example, the electricity station 180 supplies the vehicle 100*a* with power of 400 V via the station-use charging cables 182. The battery unit 110*a* is capable of being charged at high speed with the power of 400V supplied form the electricity station 180. On the other hand, the battery units 110*b* and 110*z* are capable of being charged with power of 100 V, but are not capable of being charged at high speed with power of 400 V.

To address this issue, the power feeding control section 120*a* converts the power received from the electricity station 180 into power of 100 V and supplies the power of 100 V to the vehicle 100*b*. Specifically speaking, the power feeding control section 120*a* may include a transformer that converts the voltage of the received power into a voltage appropriate to charge the battery unit 110*b*. The power feeding control section 120*a* connects the output of the transformer to the second power feeding path 122*a* to supply the vehicle 100*b* with power of a voltage appropriate to charge the battery unit 110*b*.

When the battery unit 110*b* is also capable of being charged at high speed, the power feeding control section 120*a* may supply the vehicle 100*b* with the power received from the electricity station 180 without conversion, for example, with power of 400 V. The power feeding control section 120*a* may judge whether the battery unit 110*b* is capable of being charged at high speed based on the information, obtained from the power feeding control section 120*b*, indicative of the appropriate charging voltage of the battery unit 110*b*. Alternatively, the output connector 152*a* includes a high-speed charging output socket and a non-high-speed charging output socket that can receive the inter-vehicle charging cables 184, and the power feeding control section 120*a* may judge that the battery unit 110*b* is capable of being charged at high speed when the inter-vehicle charging cables 184 are connected to the high-speed charging output socket.

The vehicle 100*z* cannot supply another vehicle 100 with power, differently from the vehicles 100*a* and 100*b*. The vehicle 100*z* is positioned at the end of the sequence of cascade-connected vehicles 100. The electricity supply system 10 can be efficiently used by parking the vehicle 100*z* far away from the electricity station 180.

Figure 2:
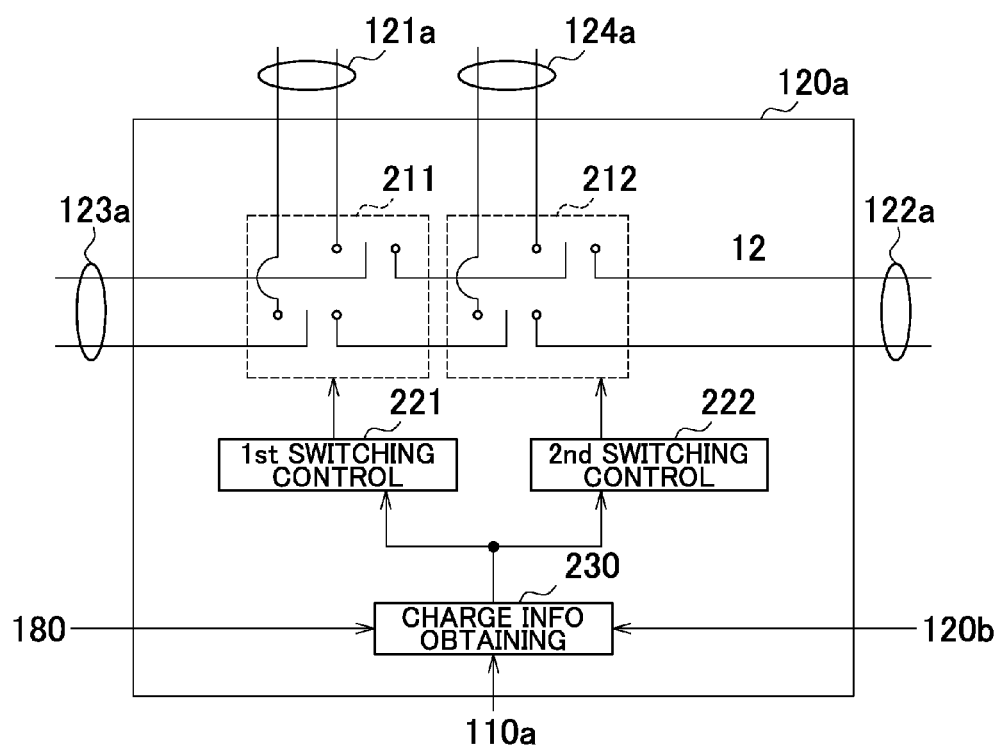
FIG. 2 illustrates an exemplary internal structure of a power feeding control section 120.

FIG. 2 illustrates an exemplary internal structure of the power feeding control section 120. The power feeding control section 120 includes a first switch section 211, a second switch section 212, a first switching control section 221, a second switching control section 222, and a charge information obtaining section 230.

The first switch section 211 switches the supply destination of the received power between the first power feeding path 121 and the second power feeding path 122. The first switching control section 221 controls the first switch section 211 to switch the supply destination of the received power. When the first switch section 211 connects the electrical receiving path 123 to the first power feeding path 121, the received power is supplied to the first power feeding path 121 and not to the second power feeding path 122.

The second switch section 212 switches whether the power stored in the battery unit 110 is supplied to the second power feeding path 122. The second switching control section 222 controls the second switch section 212 to switch whether the stored power is supplied. When the second switch section 212 connects the electrical output path 124 to the second power feeding path 122, the stored power in the battery unit 110 is supplied to the second power feeding path 122. When the second switch section 212 connects the electrical output path 124 to the second power feeding path 122, the first switch section 211 may disconnect the electrical receiving path 123 and the second power feeding path 122 from each other.

The charge information obtaining section 230 obtains from the battery unit 110 a stored power amount indicative of the amount of the power stored in the battery unit 110. When the stored power amount of the battery unit 110, which is obtained by the charge information obtaining section 230, reaches a predetermined value, the first switching control section 221 connects the electrical receiving path 123 to the second power feeding path 122. In other words, the first switching control section 221 controls the first switch section 211 to supply the received power to the second power feeding path 122.

The power feeding control section 120 can supply the received power to the second power feeding path 122 when the stored power amount of the battery unit 110 reaches a predetermined value. Therefore, the power feeding control section 120 can sequentially charge other vehicles 100 when the battery unit 110 of a given vehicle 100 is fully charged. As long as the vehicles 100 are connected to each other, the battery units 110 of the vehicles 100 are sequentially charged to full capacity. This can reduce the cost of managing the charging operations of the vehicles 100.

The charge information obtaining section 230 can obtain, from the power feeding control section 120 of another vehicle 100, a power feeding request to feed power to the vehicle 100. The charge information obtaining section 230 may obtain a power feeding request through wired communication via the second power feeding path 122. The charge information obtaining section 230 may obtain a power feeding request through wireless communication from the power feeding control section 120 of another vehicle 100.

The second switching control section 222 controls the second switch section 212 to connect the stored power to the second power feeding path 122 when requested by another vehicle 100 to feed power. Here, the second switching control section 222 may control the second switch section 212 to connect the stored power to the second power feeding path 122 under the condition that the stored power amount of the battery unit 110 exceeds a predetermined value. This condition can prevent a case where the stored power amount of the battery unit 110 becomes too small to operate the vehicle 100 as a result of feeding power to another vehicle 100.

Figure 3:
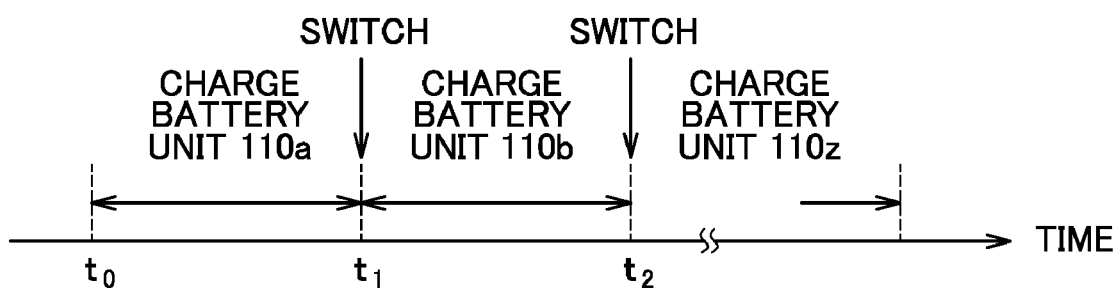
FIG. 3 illustrates an exemplary sequence of charging a plurality of battery units 110.

FIG. 3 illustrates an exemplary sequence of charging a plurality of battery units 110. The power feeding control section 120*a* starts charging the battery unit 110*a* at a timing t0 using the received power from the electricity station 180. When judging that the battery unit 110*a* is fully charged at a timing t1, the power feeding control section 120*a* controls the first switch section 211*a* to connect the electrical receiving path 123*a* to the second power feeding path 122*a*. Thus, after the timing t1, the battery unit 110*b* provided in the vehicle 100*b* starts to be charged.

The power feeding control section 120*b* receives the power from the electricity station 180 via the second power feeding path 122*a* and supplies the received power to the battery unit 110*b*. When judging that the battery unit 110*b* is fully charged at a timing t2, the power feeding control section 120*b* controls the first switch section 211*b* to connect the electrical receiving path 123*b* to the second power feeding path 122*b*. Thus, after the timing t2, the battery unit 110 of the vehicle 100 connected to the vehicle 100*b* via the inter-vehicle charging cable 184 starts to be charged.

In the above-described manner, the battery units 110 of the vehicles 100 that are cascade-connected via the inter-vehicle charging cables 184 are sequentially charged. According to the electricity supply system 10, it is not necessary to repeatedly detach and attach the station-use charging cables 182 from/to the vehicles 100, and the vehicles 100 themselves manage the charging operations without external control. Thus, the vehicles 100 can be sequentially charged without a manager. Furthermore, the electricity station 180 is only required to supply charging power via the station-use charging cables 182, and thus is not required to control the charging operations of the vehicles 100.

The vehicles 100 themselves may determine the order of the charging operations of the vehicles 100. For example, the charge information obtaining sections 230 of the vehicles 100 may exchange the indications of the stored power amounts of the battery units 110, and the first switching control sections 221 of the vehicles 100 may control the first switch sections 211 so that the priorities given to the charging operations of the battery units 110 increase as the stored power amounts of the battery units 110 decrease. This control can provide users with more vehicles 100 whose battery units 110 are charged to a certain extent. This control is suitable for the case where a large number of vehicles 100 with a minimum amount of power being stored therein are required.

Conversely, the first switching control section 221 of the vehicles 100 may control the first switch sections 211 in such a manner that the priorities given to the charging operations of the battery units 110 may increase as the stored power amounts of the battery units 110 become closer to the full capacity. This control can swiftly provide users with vehicles 100 with their battery units 110 being fully charged. This control is suitable for the case where vehicles 100 need to be swiftly prepared for long-distance travels.

Figure 4:
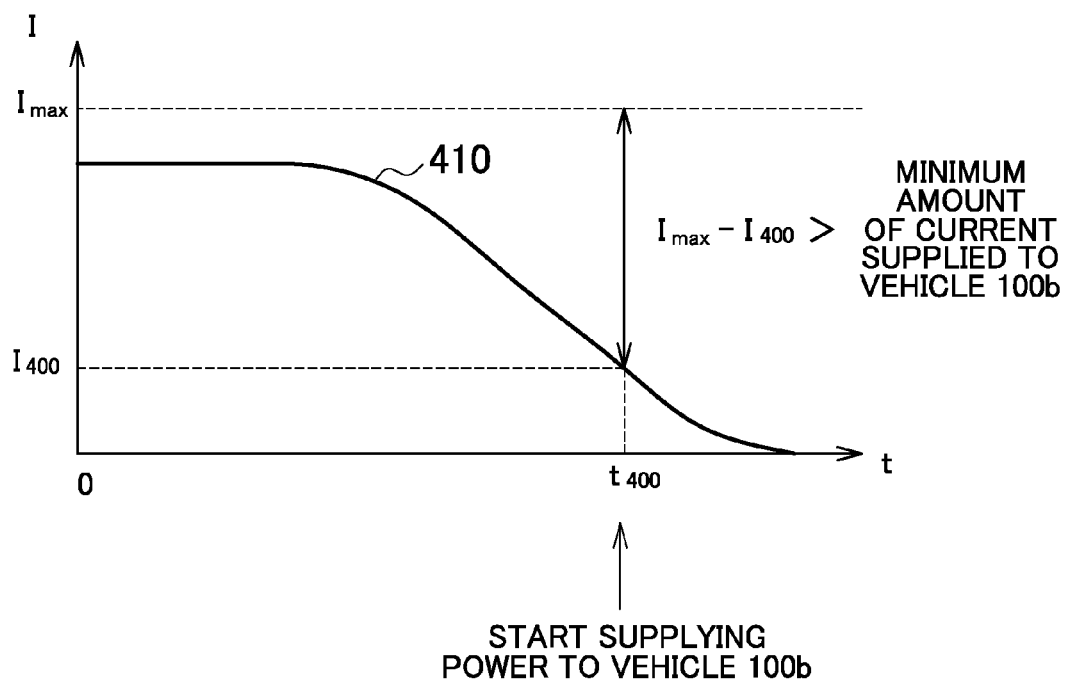
FIG. 4 illustrates, as an example, how a charging current supplied to a vehicle 100a varies over time.

FIG. 4 illustrates, as an example, how the charging current supplied to the vehicle 100a varies over time. With reference to FIG. 4, the following describes how to charge the vehicles 100 in parallel.

With reference to FIGS. 2 and 3, the above describes how to switch the destination of the received power by controlling the first switch section 211. Here, it is assumed that the electrical receiving path 123 can be connected to both of the first power feeding path 121 and the second power feeding path 122 at the same time. In addition, it is assumed that the power feeding control section 120 can control how much of the received power is supplied to the first and second power feeding paths 121 and 122 respectively. For example, the power feeding control section 120 can control how much power is supplied by using an inverter.

In FIG. 4, Imax denotes the amount of current capable of being supplied by the electricity station 180. As shown by the temporal variation 410 of the charging current, the battery unit 110a provided in the vehicle 100a is charged by a substantially constant current while the stored power amount is smaller than a predetermined value. Once the stored power amount reaches the predetermined value, the amount of the charging current is gradually reduced to prevent overcharge of the battery unit 110a.

It is assumed that, at a timing t400, a differential current amount equal to the result of subtracting the charging current amount I400 required to charge the battery unit 110a from Imax exceeds the minimum amount of current to be supplied to the vehicle 100b. If this is the case, at the timing t400, the power feeding control section 120a supplies a portion of the received power to the second power feeding path 122a in order to supply power to charge the battery unit 110b. In this way, the vehicles 100a and 100b can be charged in parallel.

As described above, the charging power is reduced in order to prevent overcharge, and the resulting surplus power can be supplied to another vehicle 100. Here, the amount of power supplied to the battery unit 110 may decrease as the stored power amount of the battery unit 110 increases for a different purpose than the purpose of preventing overcharge. In this case, sufficient surplus power to charge the battery unit 110 of a subsequent vehicle 100 can be also obtained. Therefore, the power feeding control section 120 may increase the portion of the received power that is supplied to the second power feeding path 122 as the difference between a predetermined stored power amount and the actual stored power amount of the battery decreases. More specifically, the power feeding control section 120 may increase the portion of the received power that is supplied to the second power feeding path 122 as the difference between the full charge of the battery unit 110 and the stored power amount of the battery unit 110 decreases. This control enables the vehicles 100 to be charged in parallel, thereby achieving high-speed charging of the vehicles 100.

Figure 5:
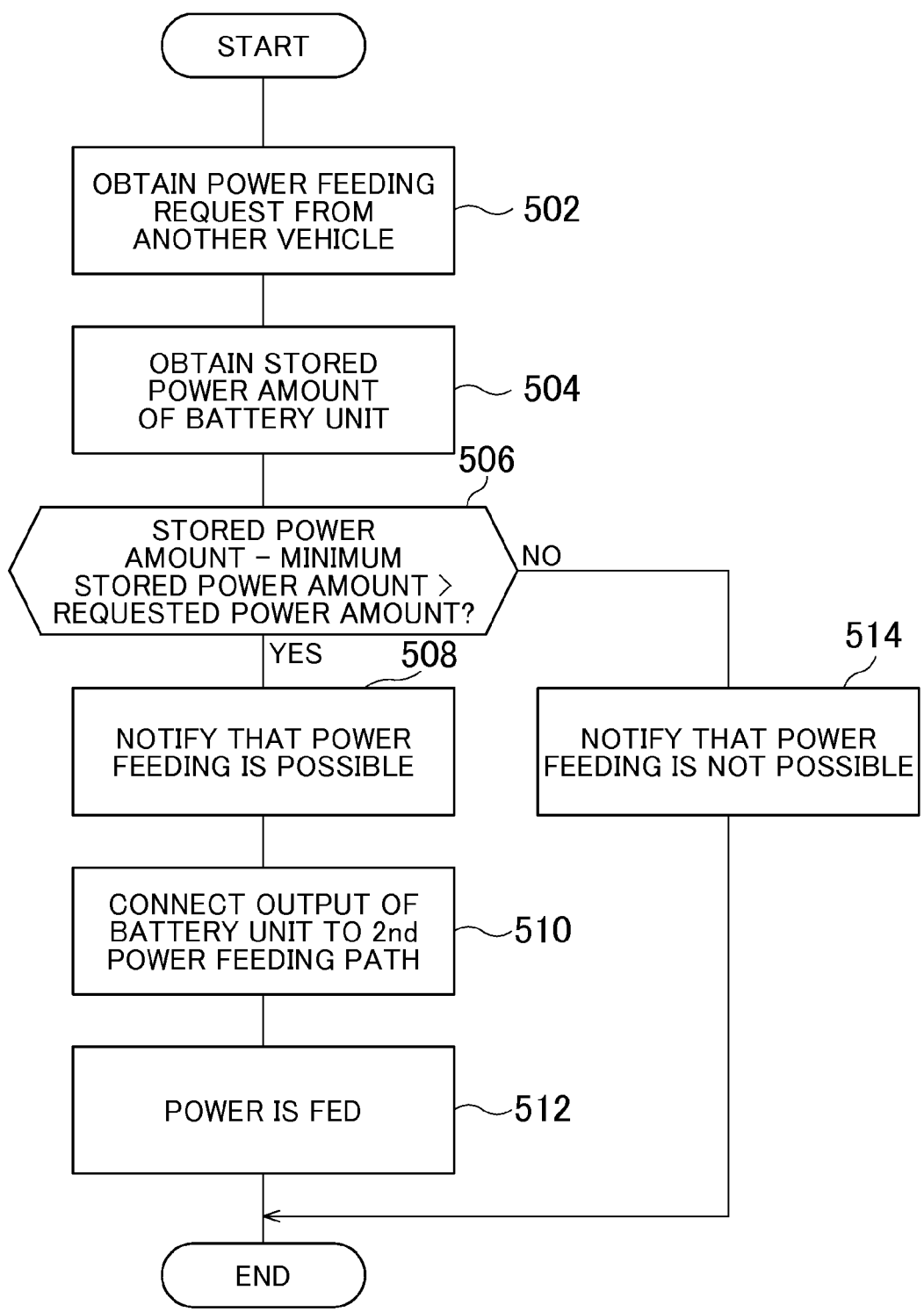
FIG. 5 illustrates an exemplary process flow of supplying stored power to another vehicle 100.

FIG. 5 illustrates an exemplary process flow of supplying stored power to another vehicle 100. Here, the description is made taking as an example a case where the stored power of the battery unit 110a is supplied to the battery unit 110b.

In a step 502, the power feeding control section 120a obtains a power feeding request from the vehicle 100b. Here, the power feeding control section 120a may obtain a power feeding request by receiving a power feeding request signal from the power feeding control section 120b. In other cases, the power feeding control section 120a can judge whether the inter-vehicle charging cables 184 are connected to the output connector 152a, and conclude that a power feeding request is issued when judging that the inter-vehicle charging cables 184 are connected to the output connector 152.

In a step 504, the charge information obtaining section 230 obtains the stored power amount of the battery unit 110a. The charge information obtaining section 230 may obtain the stored power amount of the battery unit 110a by obtaining the value of the voltage (for example, the open voltage) between the output terminals of the battery unit 110a.

In a step 506, it is judged whether the differential stored power amount equal to the result of subtracting the minimum stored power amount from the stored power amount of the battery unit 110a is larger than a requested power amount. Here, the requested power amount can be, for example, the amount of the power requested by the vehicle 100b and is required to charge the battery unit 110b. The charge information obtaining section 230 may obtain the requested power amount from the power feeding control section 120b.

When the judgment made in the step 506 is affirmative, the power feeding control section 120a notifies the power feeding control section 120b that power feeding is possible in a step 508. The power feeding control section 120b starts controlling the charging operation of the battery unit 110b under the condition that it has received the notification.

In a step 510, the second switch section 212a connects the electrical output path 124a to the second power feeding path 122a so that the output of the battery unit 110a is connected to the second power feeding path 122a. In a step 512, power is fed form the battery unit 110a to the battery unit 110b, and the process terminates once the fed power reaches the requested power amount.

When the judgment made in the step 506 is negative, the power feeding control section 120a notifies the power feeding control section 120b that power feeding is not possible and the process terminates in a step 514. When receiving this notification, the power feeding control section 120b does not start controlling the charging operation of the battery unit 110b.

According to the above-described control performed by the power feeding control sections 120, electrical power can be exchanged between the vehicles 100. Even if the vehicle 100 stops due to an insufficient stored power amount of the battery unit 110, the vehicle 100 can receive from another vehicle 100 sufficient power to travel to a nearby electricity station and thus move to the electricity station 180.

Figure 6:
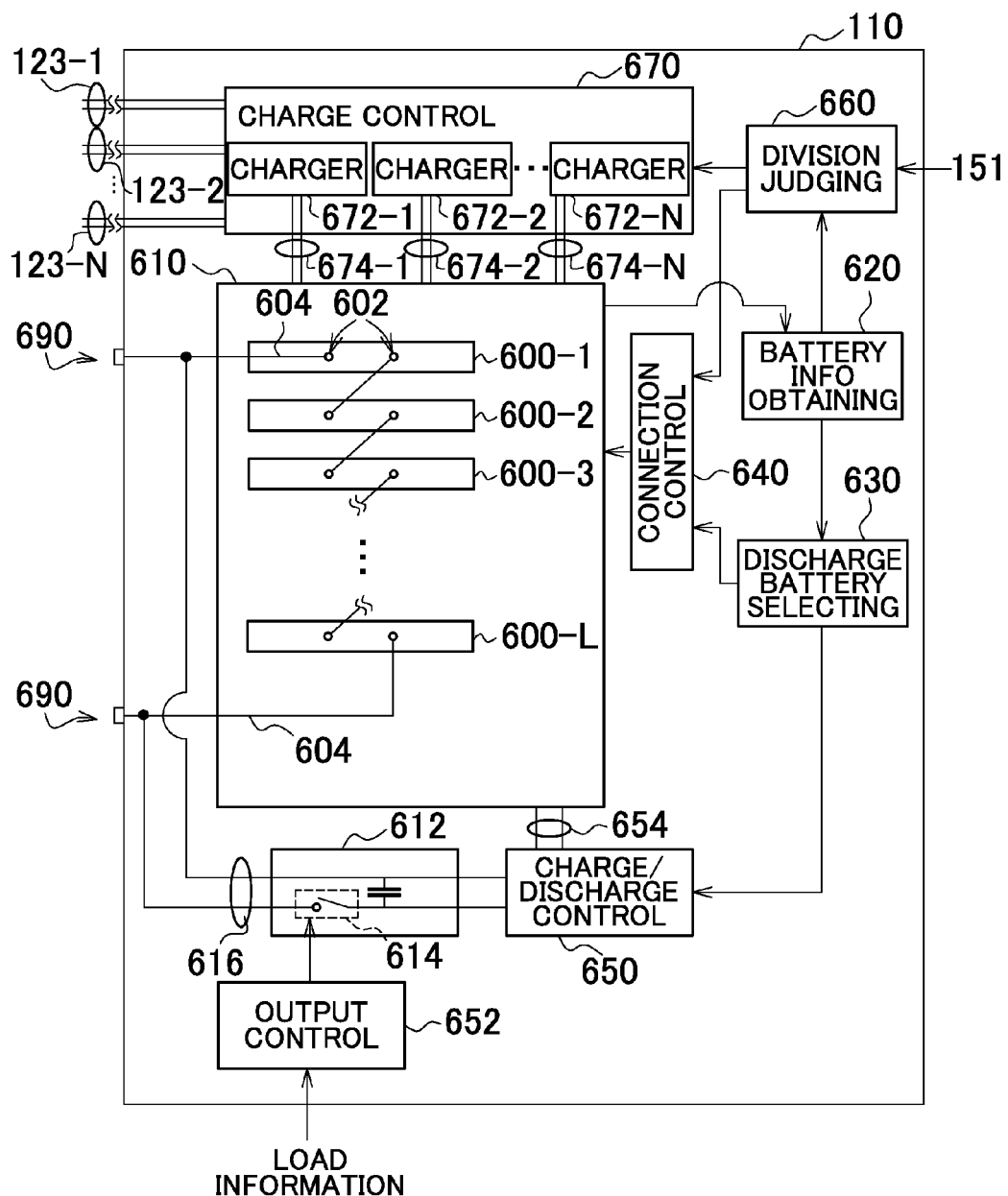
FIG. 6 illustrates an exemplary internal structure of a battery unit 110.

FIG. 6 illustrates an exemplary internal structure of the battery unit 110. The battery unit 110 includes a battery module assembly 610, a charge control section 670, a division judging section 660, a battery information obtaining section 620, a discharge battery selecting section 630, a charge/discharge control section 650, an output control section 652, an electricity storage device 612, and output terminals 690.

The above recites that each vehicle 100 include one input connector 151, one electrical receiving path 123, one AC-DC converter 130, and one first power feeding path 121 with reference to FIGS. 1 to 5. Each vehicle 100, however, may include more than one set of the input connector 151, the electrical receiving path 123, the AC-DC converter 130, and the first power feeding path 121. With such an alternative configuration, different station-use charging cables 182 can be respectively connected to the input connectors 151 at the same time. The power feeding control section 120 can separately control each set and use the power received from the plurality of input connectors 151 to charge the battery unit 110. The following later describes how to control charging when this configuration is adopted with references to FIGS. 9 and 10.

The battery module assembly 610 includes a plurality of battery modules 600. Each battery module 600 includes positive and negative terminals 602. In the following description, the left terminal in the drawing will be referred to as a positive terminal, and the right terminal will be referred to as a negative terminal. Each battery module 600 has a plurality of battery cells. Within each battery module 600, the battery cells may be connected in series. At least some of the battery cells may be connected in parallel. In the present embodiment, the battery unit 110 is an example of the battery pack relating to the present invention. In another embodiment, however, the battery module assembly 610 or the battery module 600 can act at the battery pack relating to the present invention. In the present embodiment, the battery cells are lithium ion batteries. The battery cells may be other types of rechargeable batteries such as nickel metal hydride batteries.

The output terminals at the respective ends of the series connection of the battery modules 600 are treated as the outputs of the battery module assembly 610, and are electrically connected to two output terminals 690 via electrical output paths 604. Here, at least some of the battery modules 600 may be connected in parallel. For example, the battery modules 600 are divided into a plurality of groups of series-connected battery modules, which are connected to each other in parallel. In this case, the outputs resulting from the parallel connection may be electrically connected to the output terminals 690. The two output terminals 690 are electrically connected to the electrical output path 124.

The functional block constituted by the battery information obtaining section 620, the discharge battery selecting section 630, the connection control section 640, the charge/discharge control section 650, the output control section 652, and the electricity storage device 612 acts as an electricity storage control section that can make efficient use of the electric energy stored in the battery modules 600 when their stored power amounts are reduced. The other constituents of the battery unit 110, namely the division judging section 660 and the charge control section 670, will be described with reference to FIGS. 9 and 10.

The above-described functional block serving as the electricity storage control section transfers the electrical energy stored in the battery modules 600 into the electricity storage device 612 when their stored power amounts decrease. The energy collected in the electricity storage device 612 is used when a large current flows, for example, when the motor 140 starts operating.

Specifically speaking, the discharge battery selecting section 630 selects, from among the battery modules 600, one or more battery modules 600 that store a smaller amount of power than a predetermined value, as to-be-discharged batteries. The charge/discharge control section 650 uses the energy stored in the one or more to-be-discharged batteries to charge the electricity storage device 612. The electricity storage device 612 desirably has a lower internal resistance than the battery modules 600. Preferably, the charge/discharge control section 650 uses the energy stored in the one or more to-be-discharged batteries to charge the electricity storage device 612 that has a lower internal resistance than the one or more to-be-discharged batteries.

The charge/discharge control section 650 receives the outputs from the to-be-discharged batteries via a discharge path 654. The charge/discharge control section 650 uses the electric power received from the to-be-discharged batteries via the discharge path 654 to charge the electricity storage device 612. When the output voltage during the discharge path 654 is lower than a predetermined voltage value (for example, the charging voltage observed when the electricity storage device 612 is fully charged), the charge/discharge control section 650 may increase the voltage input via the discharge path 654 and use the resulting voltage to charge the electricity storage device 612. For example, the charge/discharge control section 650 can use a charge pump to increase the voltage.

The discharge battery selecting section 630 may select a plurality of to-be-discharged batteries. The charge/discharge control section 650 may use the energy stored in the to-be-discharged batteries to charge the electricity storage device 612. When the discharge battery selecting section 630 selects a plurality of to-be-discharged batteries, the connection control section 640 connects the to-be-discharged batteries in series. The charge/discharge control section 650 then connects the series-connected to-be-discharged batteries to the electricity storage device 612 in order to charge the electricity storage device 612. As the stored power amounts decrease, the voltage between the outputs of the battery modules 600 also decreases. To compensate for this, the connection control section 640 connects the to-be-discharged batteries in series. Consequently, the voltage on the discharge path 654 can be maintained high. Therefore, the charge/discharge control section 650 may be able to charge the electricity storage device 612 without the need of increasing the voltage.

The battery information obtaining section 620 obtains the internal resistance values of the battery modules 600 as the values indicative of the stored power mounts of the battery modules 600. The discharge battery selecting section 630 selects, from among the battery modules 600, one or more battery modules 600 having internal resistance values larger than a predetermined value as to-be-discharged batteries.

When the electrical power to be supplied from a plurality of batteries to an electric load exceeds a predetermined value, the output control section 652 supplies the electric load with at least the energy stored in the electricity storage device 612. Specifically speaking, the output control section 652 supplies the energy stored in the electricity storage device 612 to the electric load by changing the state of a connection switch 614 from the open state to the closed state. Specifically speaking, the output control section 652 supplies the energy stored in the electricity storage device 612 to the electric load by closing the connection switch 614 to electrically connect an electrical connection path 616 to the output terminals 690.

The examples of the electric load can include the motor 140 and other electrical devices provided in the vehicle 100. For example, the output control section 652 may supply at least the energy stored in the electricity storage device 612 to the other electrical devices to provide switch-on power when the other electric devices are powered on.

As described above, the battery modules 600 are provided in the vehicle 100 and supplies the energy stored therein to the motor 140 provided in the vehicle 100, but the output control section 652 may supply the motor 140 with at least the energy stored in the electricity storage device 612 in order to start the motor 140. The output control section 652 may supply the electric load with the energy stored in the electricity storage device 612 when detecting load information such as a start signal to start the motor 140 and a power-on signal to instruct that the other electric devices be powered on.

According to the above description, the energy stored in the to-be-discharged batteries is used to charge the electricity storage device 612, which is separate from the battery module assembly 610. In another example, however, the energy stored in the to-be-discharged batteries may be used to charge the battery modules 600 other than the to-be-discharged batteries. Specifically speaking, the discharge battery selecting section 630 may select, from among the battery modules 600, one or more battery modules 600 that have a relatively smaller stored power amount than the other battery modules 600, as one or more to-be-discharged batteries. The charge/discharge control section 650 may use the energy stored in the one or more to-be-discharged batteries to charge the other battery modules 600.

Figure 7:
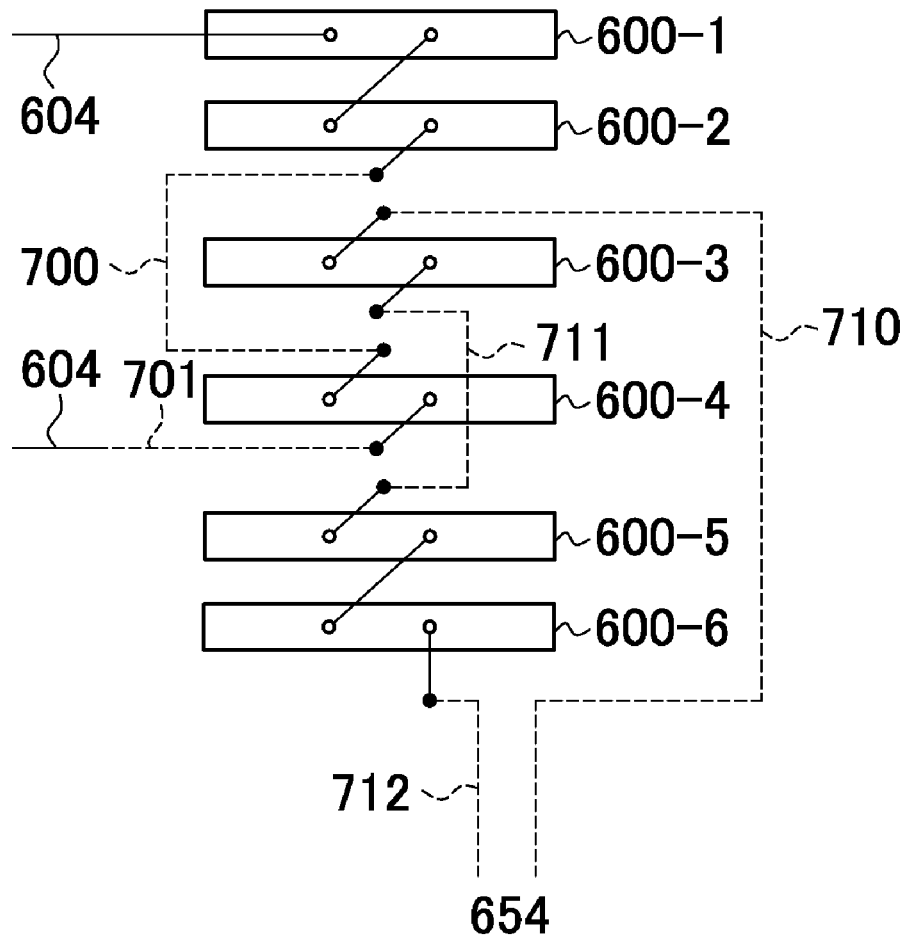
FIG. 7 illustrates, as an example, how battery modules 600 are connected.

FIG. 7 illustrates, as an example, how the battery modules 600 are connected. For the sake of simplicity, the following description is made by referring to an exemplary case where the connection control section 640 switches the connections between six battery modules 600. When every one of the battery modules 600 has a stored power amount equal to or larger than a predetermined reference value, the battery modules 600 are connected in series.

Here, it is assumed that the discharge battery selecting section 630 selects, as to-be-discharged batteries, a battery module 600-3, a battery module 600-5, and a battery module 600-6 that have a stored power amount lower than a predetermined reference value, based on the stored power amounts obtained by the battery information obtaining section 620. The connection control section 640 terminates the connection between the battery module 600-2 and the battery module 600-3, and electrically connects the positive terminal of the battery module 600-3 to the discharge path 654 via an electrical bypass path 710.

Furthermore, the connection control section 640 terminates the connection between the battery module 600-3 and the battery module 600-4, terminates the connection between the battery module 600-4 and the battery module 600-5, and electrically connects the negative terminal of the battery module 600-3 to the positive terminal of the battery module 600-5 via an electrical bypass path 711. The connection control section 640 then connects the negative terminal of the battery module 600-6 to the discharge path 654 via an electrical bypass path 712. In this way, the battery modules 600-3, 600-5, and 600-6 are connected in series, and the outputs at the respective ends of the series connection are connected to the discharge path 654. The charge/discharge control section 650 can perform control to transfer the energy stored in the battery modules 600-3, 600-5, and 600-6 to the electricity storage device 612.

The connection control section 640 also electrically connects the negative terminal of the battery module 600-2 to the positive terminal of the battery module 600-4 via an electrical bypass path 700. The connection control section 640 also electrically connects the negative terminal of the battery module 600-4 to the electrical output path 604 via an electrical bypass path 701. In this way, the respective output ends of the series connection among the battery modules 600-1, 600-2 and 600-4 are electrically connected to the electrical output path 604.

Figure 8:
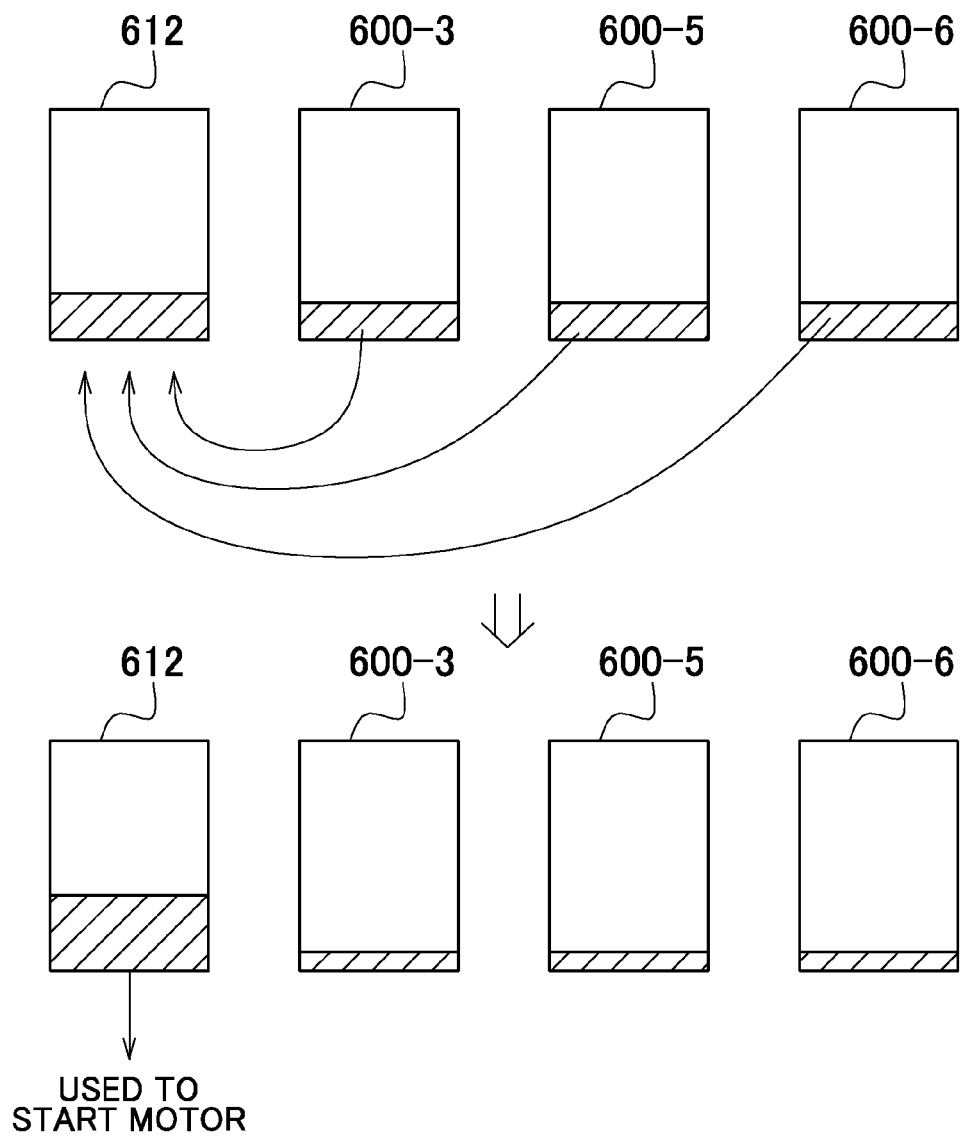
FIG. 8 schematically illustrates how energy is transferred to an electricity storage device 612.

FIG. 8 schematically illustrates how the energy is transferred to the electricity storage device 612. A predetermined portion of the energy left in each of the battery modules 600-3, 600-5, and 600-6 is transferred to the electricity storage device 612 as electrical power and stored, for example, in the form of electrical charges in the electricity storage device 612. The charge/discharge control section 650 terminates the charge of the electricity storage device 612 to leave a predetermined amount of energy in each of the battery modules 600-3, 600-5, and 600-6. This can prevent the to-be-discharged battery modules 600 from being completely discharged.

Figure 10:
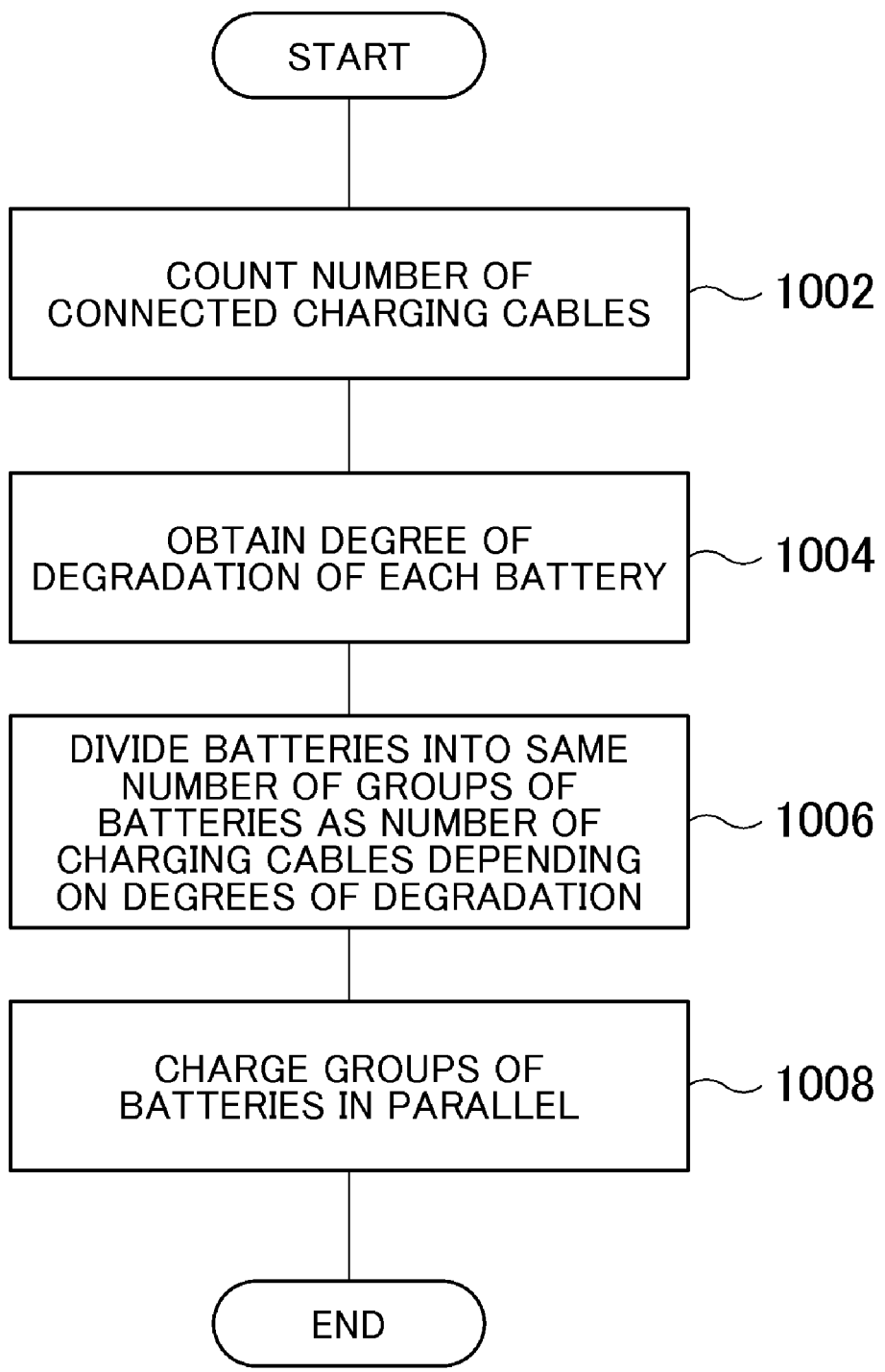
FIG. 10 illustrates an exemplary process flow of charging a plurality of groups of batteries in parallel.

FIG. 9 illustrates, as an example, how a plurality of groups of batteries, into which the battery modules 600 are divided, are connected to each other when charged in parallel. With reference to FIGS. 9 and 10, the following describes the functions and operations of the battery information obtaining section 620, the connection control section 640, the division judging section 660, and the charge control section 670. The functional block constituted by the battery information obtaining section 620, the connection control section 640, the division judging section 660, and the charge control section 670 acts as a charge control section that charges a plurality of groups of batteries in parallel.

The following describes the functions and operations of the constituents that together function as the charge control section. The connection control section 640 divides the battery modules 600 into a plurality of groups of batteries by switching the connections between the battery modules 600, according to a received current amount indicative of the amount of the current that can be received from one or more external power sources. Specifically speaking, the connection control section 640 increases the number of the groups of batteries into which the battery modules 600 are divided as the received current amount increases. The charge control section 670 charges the resulting groups of batteries in parallel with the power received from the external power sources. Specifically speaking, the charge control section 670 divides the power received from the external power sources into the same number of powers as the number of the groups of batteries and uses the resulting powers to charge the groups of batteries in parallel.

For the sake of simplicity, the received current amount can be indicated by the number of the input connectors 151 to which the station-use charging cables 182 or the inter-vehicle charging cables 184 (collectively referred to as the charging cables) are connected. For example, when the charge is carried out by using charging cables that can each supply electrical power of 100 V and 15 A, the received current amount automatically increases as the number of the connected charging cables increases.

Here, the input connectors 151 are generally referred to as a connector section. A plurality of charging cables, which supply the vehicle 100 with power from external power sources, are externally attachable and detachable to/from the connector section. The connection control section 640 increases the number of the groups of batteries into which the battery modules 600 are divided as the number of the charging cables attached to the connector section increases. In practice, the connection control section 640 divides the battery modules 600 into the same number of the groups of batteries as the number of the charging cables attached to the connector section.

Here, each charging cable supplies power from an independent external power source. Therefore, the connection control section 640 increases the number of the groups of batteries into which the battery modules 600 are divided as the number of external power sources from which the battery modules 600 can receive power increases. In practice, the connection control section 640 divides the battery modules 600 into the same number of the groups of batteries as the number of the external power sources.

The division judging section 660 judges whether the battery modules 600 are to be divided into a plurality of groups of batteries. For example, the division judging section 660 may judge that the battery modules 600 are to be divided into a plurality of groups of batteries when a plurality of charging cables are connected to the connector section. The division judging section 660 may judge whether the battery modules 600 are to be divided into a plurality of groups of batteries depending on the received current amount.

When the division judging section 660 judges that the battery modules are to be divided, the connection control section 640 divides the battery modules into a plurality of groups of batteries. When the division judging section 660 judges that the battery modules are to be divided, the charge control section 670 charges the resulting plurality of groups of batteries in parallel with the power received from the external power sources.

Here, it is assumed that N input connectors 151 are provided. It is also assumed that the powers received via the charging cables connected to the input connectors 151 are respectively supplied via electrical receiving paths 123-1 to N. The charge control section 670 includes a plurality of chargers 672-1 to N. In the following description, the electrical receiving paths 123-1 to N are generally referred to as the electrical receiving path 123 or the electrical receiving paths 123. The chargers 672-1 to N are generally referred to as the charger 672 or the chargers 672. The chargers 672 correspond to the electrical receiving paths 123. Each of the chargers 672 receives power from a corresponding one of the electrical receiving paths 123. Each of the chargers 672 uses the power received from the corresponding electrical receiving path 123 to charge a corresponding group of batteries.

Referring to FIG. 9, exemplary groups of batteries defined by the connection control section 640 are shown. For the sake of simplicity, the following description is made by referring to an exemplary case where the connection control section 640 switches the connections between six battery modules 600. To avoid redundancy, it is assumed that the battery modules 600 are divided in the same manner as shown in FIG. 7. In other words, the battery modules 600 are assumed to be divided into a first group of batteries including the battery modules 600-1, 600-2 and 600-4, and a second group of batteries including the battery modules 600-3, 600-5 and 600-6.

An electrical bypass path 900 is equivalent to the electrical bypass path 700, and an electrical bypass path 911 is equivalent to the electrical bypass path 711. The following describes how to connect electrical bypass paths 901, 910, and 912 which are different from the electrical bypass paths described with reference to FIG. 7.

The positive terminal of the battery module 600-1 is connected not to the electrical output path 604 but to an individual charge path 674-1. The negative terminal of the battery module 600-4 is electrically connected to the individual charge path 674 via the electrical bypass path 901. The positive terminal of the battery module 600-3 is electrically connected to an individual charge path 674-2 via the electrical bypass path 910. The negative terminal of the battery module 600-6 is connected to the individual charge path 674-2 via the electrical bypass path 912.

The first group of batteries is charged by the charger 672-1 via the individual charge path 674-1. The second group of batteries is charged by the charger 672-2 via the individual charge path 674-2. The number of battery modules 600 charged by a single charging cable can be made smaller when two charging cables are used than when only one charging cable is used. Therefore, the battery modules 600 may be charged within a shorter period of time compared with the case where a single charging cable is used.

For example, when a single charging cable is used to receive power of 100 V and 15 A, it may not be possible to charge the battery modules 600 at high speed. On the other hand, when the electrical receiving paths 123-1 and 123-2 can each receive power of 100V and 15 A, the battery modules 600 can be charged with a higher voltage than when a single charging cable is used to receive power. If a sufficiently high voltage can be achieved to perform high-speed charge, the individual groups of batteries can be charged at high speed. Accordingly, the battery unit 110 can be charged extremely swiftly.

FIG. 10 illustrates an exemplary process flow of charging a plurality of groups of batteries in parallel. In a step 1002, the division judging section 660 counts the number of the input connectors 151 to which charging cables are connected. For example, each input connector 151 may be provided with a switch that opens or closes in response to whether a charging cable is connected or not, and the division judging section 660 may count the number of the input connectors 151 to which charging cables are connected by obtaining the output indicative of whether the switch is opened or closed.

In a step 1004, the battery information obtaining section 620 obtains information indicative of the degree of degradation of each battery module 600. The degree of degradation of each battery module 600 may be determined based on the measured value of the internal resistance of each battery module 600. The measured value of the internal resistance of each battery module 600 itself can be used as the degree of degradation of the battery module 600.

In other instances, each battery module 600 may have a memory that has degradation information stored thereon. The battery information obtaining section 620 may obtain the information indicative of the degree of degradation of each battery module 600 by obtaining the degradation information stored in the memory. The degree of degradation may be calculated based on a charge curve observed when the battery module 600 is charged or a discharge curve observed when the battery module 600 is discharged, and stored in the memory. The degree of degradation of each battery module 600 may be indicated by an average value (for example, a mean value, a median value or the like) of the degrees of degradation of the battery cells included in the battery module 600. Alternatively, the degree of degradation of each battery module 600 may be indicated by the highest degree of degradation among the degrees of degradation of the battery cells in the battery module 600.

In a step 1006, the connection control section 640 divides the battery modules 600 into the same number of groups of batteries as the number of connected charging cables according to the degrees of degradation of the battery modules 600. Specifically speaking, the connection control section 640 may divide battery modules with similar degrees of degradation into the same group of batteries. For example, when dividing the battery modules 600 into two groups of batteries, the connection control section 640 may select a predetermined number of battery modules 600 in the descending order of the degree of degradation and connect the selected battery modules 600 in series, and select and connect the other battery modules 600 in series. In a step 1008, each of the chargers 672 charges a corresponding one of the groups of batteries. Grouping the battery modules 600 depending on their degrees of degradation can allow for appropriate charge control depending on the degrees of degradation.

In the step 1006, the connection control section 640 may divide the battery modules 600 into a plurality of groups of batteries depending on their internal resistance values. For example, the connection control section 640 may divide battery modules 600 with similar internal resistance values into the same group of batteries. The internal resistance values may be obtained by the battery information obtaining section 620 in the step 1004. Grouping the battery modules 600 depending on their internal resistance values can allow for appropriate charge control depending on the internal resistance values.

In addition, the connection control section 640 may divide the battery modules 600 into a plurality of groups of batteries depending on their stored power amounts. The connection control section 640 may divide the battery modules 600 with similar stored power amounts into the same group of batteries. The stored power amounts may be obtained by the battery information obtaining section 620 in the step 1004. Here, the connection control section 640 may divide the battery nodules 600 into a plurality of groups of batteries in such a manner that the total of the stored power amounts of the battery modules 600 included in each group of batteries becomes substantially the same. This may be able to equalize the period of time necessary to charge the respective groups of batteries.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

What is claimed is:

1. A charge control apparatus for controlling how to charge a battery unit having a plurality of batteries connected in series, comprising:

a connection control section operable to divide the batteries into a plurality of groups of batteries by switching connections between the batteries, according to a received current amount indicative of an amount of a current that can be received from one or more external power sources; and a charge control section operable to charge the groups of batteries in parallel with power received from the external power sources, wherein the connection control section is operable to divide the batteries into more groups when the received current amount is greater.

2. The charge control apparatus as set forth in claim 1, wherein the connection control section is operable to divide the batteries into more groups when the number of the external power sources is greater.

3. The charge control apparatus as set forth in claim 1, wherein the connection control section is operable to divide the batteries into the same number of groups as the number of the external power sources.

4. The charge control apparatus as set forth in claim 1, further comprising a division judging section operable to judge, based on the received current amount, whether the batteries are to be divided into the groups of batteries, wherein when the division judging section judges that the batteries are to be divided, the connection control section divides the batteries into the groups of batteries, and when the division judging section judges that the batteries are to be divided, the charge control section charges the groups of batteries in parallel with the power received from the external power sources.

5. The charge control apparatus as set forth in claim 1, further comprising a battery information obtaining section operable to obtain information indicative of a degree of degradation of each of the batteries, wherein the connection control section is operable to divide batteries with similar degrees of degradation into the same group of batteries.

6. The charge control apparatus as set forth in claim 1, further comprising a battery information obtaining section operable to obtain information indicative of an internal resistance of each of the batteries, wherein the connection control section is operable to divide batteries with similar internal resistances into the same group of batteries.

7. A battery pack comprising:

a plurality of batteries connected in series; and the charge control apparatus as set forth in claim 1 that controls how to charge a battery unit including the batteries.

8. A vehicle comprising:

a battery pack including a plurality of batteries connected in series and the charge control apparatus as set forth in claim 1 that controls how to charge a battery unit including the batteries; and a motor operable to be driven by energy stored in the battery pack.

9. The vehicle as set forth in claim 8, further comprising a connector section to/from which a plurality of charging cables are externally attachable and detachable, the charging cables operable to supply power from the external power sources to the vehicle, wherein the connection control section is operable to divide the batteries into more groups when the number of the charging cables attached to the connector section is greater.

10. The vehicle as set forth in claim 9, wherein
the connection control section is operable to divide the batteries into the same number of groups as the number of the charging cables attached to the connector section.

11. The charge control apparatus as set forth in claim 1, further comprising
a battery information obtaining section operable to obtain information indicative of a stored power amount of each of the batteries, wherein
the connection control section is operable to divide batteries with similar stored power amounts into the same group of batteries.

12. A vehicle comprising:
a battery pack including a plurality of batteries connected in series and the charge control apparatus as set forth in claim 1 that controls how to charge a battery unit including the batteries; and
a motor operable to be driven by energy stored in the battery pack.

13. The vehicle as set forth in claim 12, wherein
the connection control section is operable to divide the batteries according to a received current amount indicative of an amount of a current that can be received from one or more external power sources,
the vehicle further comprises a connector section to/from which a plurality of charging cables are externally attachable and detachable, the charging cables operable to supply power from the external power sources to the vehicle, and
the connection control section is operable to divide the batteries into more groups when the number of the charging cables attached to the connector section is greater.

14. The vehicle as set forth in claim 13, wherein
the connection control section is operable to divide the batteries into the same number of groups as the number of the charging cables attached to the connector section.

15. A charge control apparatus for controlling how to charge a battery unit having a plurality of batteries connected in series, comprising:
a connection control section operable to divide the batteries into a plurality of groups of batteries by switching connections between the batteries;
a charge control section operable to charge the groups of batteries in parallel with power received from the external power sources; and
a battery information obtaining section operable to obtain information indicative of a degree of degradation of each of the batteries, wherein
the connection control section is operable to divide batteries with similar degrees of degradation into the same group of batteries.

16. The charge control apparatus as set forth in claim 15, wherein
the connection control section is operable to divide the batteries according to a received current amount indicative of an amount of a current that can be received from one or more external power sources and to divide the batteries into more groups when the number of the external power sources is greater.

17. The charge control apparatus as set forth in claim 15, wherein
the connection control section is operable to divide the batteries according to a received current amount indicative of an amount of a current that can be received from one or more external power sources and to divide the batteries into the same number of groups as the number of the external power sources.

18. The charge control apparatus as set forth in claim 15, wherein
the connection control section is operable to divide the batteries according to a received current amount indicative of an amount of a current that can be received from one or more external power sources,
the charge control apparatus further comprises a division judging section operable to judge, based on the received current amount, whether the batteries are to be divided into the groups of batteries,
when the division judging section judges that the batteries are to be divided, the connection control section divides the batteries into the groups of batteries, and
when the division judging section judges that the batteries are to be divided, the charge control section charges the groups of batteries in parallel with the power received from the external power sources.

19. A battery pack comprising:
a plurality of batteries connected in series; and
the charge control apparatus as set forth in claim 15 that controls how to charge a battery unit including the batteries.

20. The charge control apparatus as set forth in claim 15, further comprising
a battery information obtaining section operable to obtain information indicative of a stored power amount of each of the batteries, wherein
the connection control section is operable to divide batteries with similar stored power amounts into the same group of batteries.

* * * * *